(12) United States Patent
Varelius

(10) Patent No.: US 10,643,409 B2
(45) Date of Patent: May 5, 2020

(54) WAKING UP HOME DOOR BLUETOOTH SMART LOCK

(71) Applicant: KONE Corporation, Helsinki (FI)

(72) Inventor: Ari Varelius, Helsinki (FI)

(73) Assignee: KONE CORPORATION, Helsinki (FI)

(*) Notice: Subject to any disclaimer, the term of this patent is extended or adjusted under 35 U.S.C. 154(b) by 0 days.

(21) Appl. No.: 16/026,211

(22) Filed: Jul. 3, 2018

(65) Prior Publication Data
US 2019/0026966 A1 Jan. 24, 2019

(30) Foreign Application Priority Data

Jul. 19, 2017 (EP) .................... 17182055

(51) Int. Cl.
G07C 9/00 (2020.01)
B66B 1/46 (2006.01)
H04L 29/06 (2006.01)
H04W 4/80 (2018.01)

(52) U.S. Cl.
CPC .......... *G07C 9/00309* (2013.01); *B66B 1/468* (2013.01); *G07C 9/00571* (2013.01); *G07C 9/00904* (2013.01); *H04L 63/0853* (2013.01); *B66B 2201/4676* (2013.01); *G07C 2009/00365* (2013.01); *G07C 2009/00373* (2013.01); *G07C 2009/00404* (2013.01); *H04W 4/80* (2018.02)

(58) Field of Classification Search
CPC ........... B66B 1/468; B66B 2201/4676; G07C 2009/00365; G07C 2009/00373; G07C 2009/00404; G07C 9/00309; G07C 9/00571; G07C 9/00904; H04L 63/0853; H04W 4/08
See application file for complete search history.

(56) References Cited

U.S. PATENT DOCUMENTS

| 9,437,062 B2* | 9/2016 | Ahearn ............... G07C 9/00174 |
| 2006/0164205 A1 | 7/2006 | Buckingham et al. |
| 2010/0136903 A1* | 6/2010 | Lee ........................ H04B 7/155 455/17 |
| 2010/0201482 A1 | 8/2010 | Robertson et al. |
| 2016/0098874 A1* | 4/2016 | Handville .......... G07C 9/00007 340/5.61 |
| 2016/0307681 A1 | 10/2016 | Shaffer et al. |

* cited by examiner

*Primary Examiner* — Nader Bolourchi
(74) *Attorney, Agent, or Firm* — Birch, Stewart, Kolasch & Birch, LLP

(57) ABSTRACT

A control system is provided which comprises a controller and an interface. The controller is configured to detect at least one user permitted to use at least one smart lock, and send a wake-up command via the interface to the at least one smart lock by which the at least one smart lock is instructed to activate a radio connection for a mobile device of the at least one user.

13 Claims, 4 Drawing Sheets

WAKING UP HOME DOOR BLUETOOTH SMART LOCK

FIELD OF THE INVENTION

The present invention relates to an apparatus, a method and a computer program product for controlling a smart lock, such as a home door smart lock which uses a Bluetooth radio connection.

RELATED BACKGROUND ART

The following description of background art and examples may include insights, discoveries, understandings or disclosures, or associations, together with disclosures not known to the relevant prior art, to at least some examples of embodiments of the present invention but provided by the invention. Some of such contributions of the invention may be specifically pointed out below, whereas other of such contributions of the invention will be apparent from the related context.

Some examples of the present disclosure relate to smart locks which are provided at doors, for example of flats, offices etc. Home smart locks in residential buildings are almost all battery powered. Thus, a smart lock which can provide a radio connection via Bluetooth, for example, would require a large power amount when the Bluetooth connection would always be on. Thus, usually the smart lock will not emit a Bluetooth signal all the time. Hence, a user is needs to open his/her phone application, for example, to open the door. This is cumbersome for the user.

SUMMARY OF THE INVENTION

Thus, it is an object of the present invention to overcome this disadvantages and to provide a better user experience and hands free opening for a home door smart lock.

According to a first aspect of the present invention a smart lock is provided which comprises:
 a controller,
 a communication means and
 a lock opening/closing means, wherein the controller is configured to
 receive a wake-up command from a control system,
 set the communication means into a state capable of sending and/or receiving a radio signal in response to receiving the wake-up command,
 perform communication with a mobile device of a user via the communication means,
 authenticate the mobile device, and
 instruct the lock opening/closing means to open the lock in case an access to the lock has been allowed to the authenticated mobile device.

According to a second aspect of the present invention a method for controlling a smart lock, which comprises:
 receiving a wake-up command from a control system,
 setting communication means into a state capable of sending and/or receiving a radio signal in response to receiving the wake-up command,
 performing communication with a mobile device of a user via the communication means,
 authenticating the mobile device, and
 instructing the lock opening/closing means to open the lock in case the mobile device is authenticated.

The first and second aspects may be modified as follows:
The transmitter may be shifted into a state in which it is not capable of sending and/or receiving a radio signal after the lock has been opened or after a predetermined time after receiving the wake-up command.

The radio signal may be a Bluetooth signal.

According to a third aspect of the present invention a control system is provided which comprises:
 a controller and
 an interface means,
 wherein the controller is configured to
 detect at least one user admitted to use at least one smart lock, and
 send a wake-up command via the interface means to the at least one smart lock by which the smart lock is instructed to activate a radio connection for a mobile device of the user.

According to a fourth aspect of the present invention a control method is provided which comprises:
 detecting at least one user admitted to use at least one smart lock, and
 sending a wake-up command to the at least one smart lock by which the smart lock is instructed to activate a radio connection for a mobile device of the user.

The third and fourth aspects may be modified as follows:
The user may be detected by performing an authentication with the user and/or by performing a recognition of the user.

The at least one smart lock may belong to a group of smart locks, and the wake-up command may be sent to all smart locks of the group of the smart locks when detecting a user admitted to use at least one smart lock of the group of smart locks.

Moreover, the control system or the control method may control an elevator, and the group of smart locks may be provided on doors on a predetermined floor, wherein the user admitted to use at least one smart lock of the group of smart locks is detected when a call is made to the predetermined floor or an elevator car is arriving at the predetermined floor.

The control system or the control method may control site and/or building related control functions.

The control system or the control method may control main door access and/or an elevator access.

The wake-up command may be sent to the at least one smart lock via a smart lock control device configured to control the at least one smart lock.

The control system according to the third aspect and/or its modifications may comprise a smart lock according to the first aspect and/or its modifications as the at least one smart lock. Moreover, the control method according to the fourth aspect and/or its modifications may comprise a method for controlling a smart lock according to the second aspect and/or its modifications.

In addition, according to another aspect of the present invention, there is provided a computer program product for a computer, including software code portions for performing the steps of the above defined methods according to the second and fourth aspects and/or their modifications, when said product is run on the computer. The computer program product may include a computer-readable medium on which said software code portions are stored. Furthermore, the computer program product may be directly loadable into the internal memory of the computer or transmittable via a network by means of at least one of upload, download and push procedures.

According to a still further aspect of the present invention a smart lock is provided which comprises means for receiving a wake-up command from a control system, means for setting the communication means into a state capable of sending and/or receiving a radio signal in response to receiving the wake-up command, means for performing communication with a mobile device of a user via the communication means, means for authenticating the mobile device, and means for instruct a lock opening/closing means of the lock to open the lock in case an access to the lock has been allowed to the authenticated mobile device.

According to a still further aspect of the present invention a smart lock is provided which comprises means for detecting at least one user admitted to use at least one smart lock, and means for sending a wake-up command via an interface means to the at least one smart lock by which the smart lock is instructed to activate a radio connection for a mobile device of the user.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION OF EMBODIMENTS

In the following, description will be made to embodiments of the present invention. It is to be understood, however, that the description is given by way of example only, and that the described embodiments are by no means to be understood as limiting the present invention thereto.

It is to be noted that the following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

The general elements and functions of the described elevator and/or main access control systems etc., details of which also depend on the actual type of system, are known to those skilled in the art, so that a detailed description thereof is omitted herein. However, it is to be noted that several additional devices and functions besides those described below in further detail may be employed in an elevator system.

Figure 1:
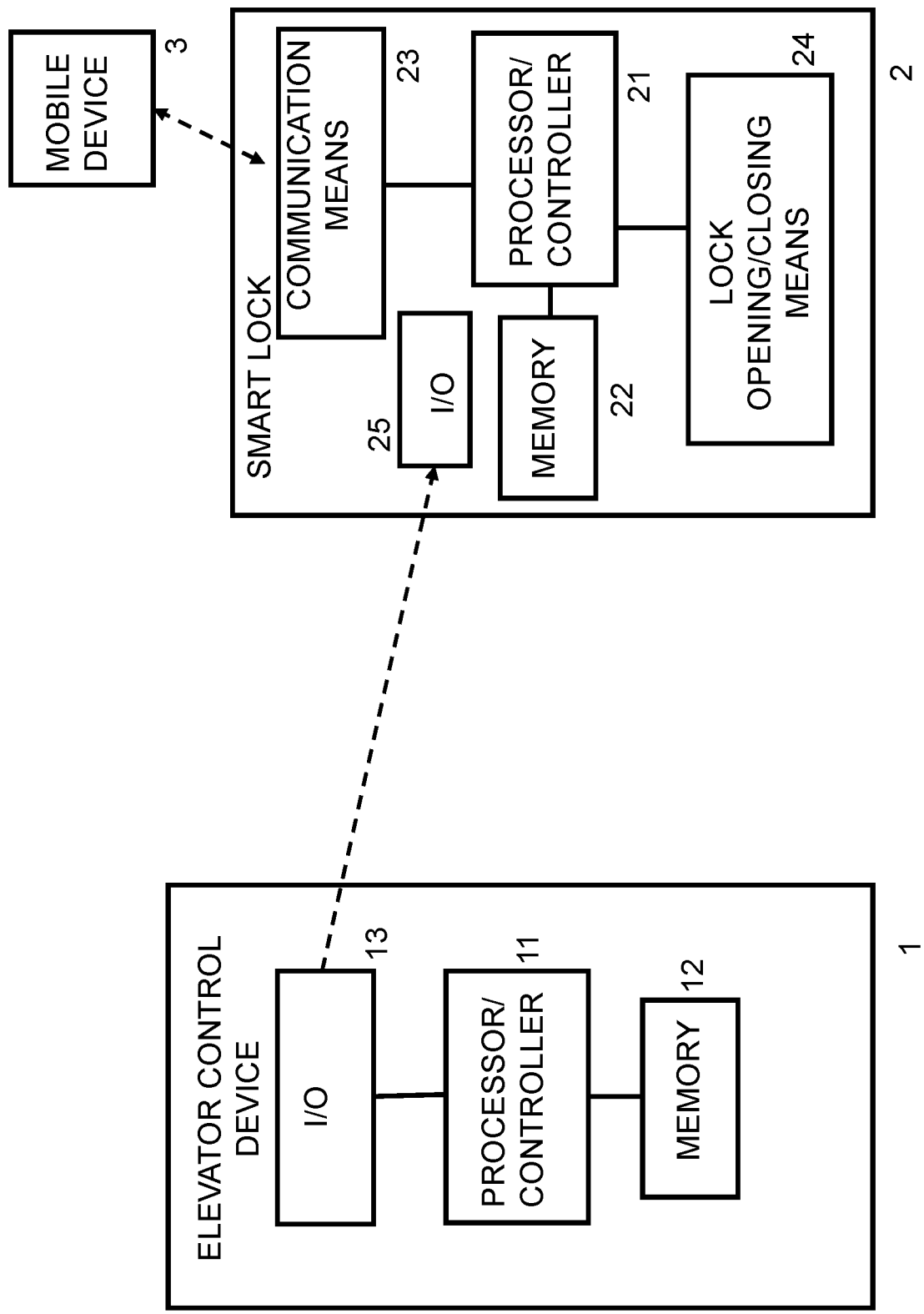
FIG. 1 shows an elevator control device and a smart lock according to some embodiments of the present invention.

FIG. 1 shows a schematic diagram illustrating a configuration according to an embodiment of the present invention. In particular, an elevator control device 1 is shown as an example for a control system. The elevator control device 1 comprises a processor or controller 11 and an interface means 13, by which a communication to other systems/units etc. is possible. The elevator control device may further comprise a memory 12 in which programs to be carried out and data required are stored.

Furthermore, FIG. 1 shows a smart lock 2 according to the embodiment. The smart lock 2 comprises a processor or controller 21 and a communication means 23, by which a communication to a mobile device 3 of a user is possible, as indicated by a dashed arrow. The smart key 2 further comprises a lock opening/closing means 24 for opening and closing a lock of the smart lock. The smart key 2 may further comprise a memory 22 in which programs to be carried out and data required are stored, and an interface means (I/O) 25, by which a connection to other systems/units etc. is possible. In particular, by the interface means 25, the smart lock 2 may receive information from the interface means 13 of the control system 1, as indicated by a dashed arrow. This connection may be carried out via other elements arranged between the control system 1 and the smart key 2, as will be described later.

Figure 2:
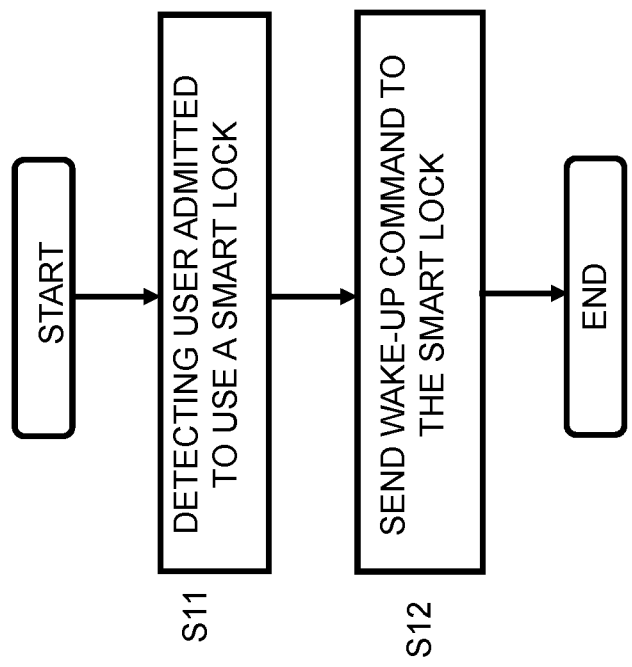
FIG. 2 shows a flowchart illustrating a procedure performed by a control system according to an embodiment of the present invention.

The controller 11 of the control system 1 shown in FIG. 1 may be configured to carry out a method as illustrated in FIG. 2.

In particular, in step S11, the controller 11 detects at least one user admitted to use at least one smart lock. In step S12, the controller sends a wake-up command via the communication means 13 to the at least one smart lock (e.g., the smart lock 2) by which the smart lock is instructed to activate a radio connection for a mobile device of the user.

Figure 3:
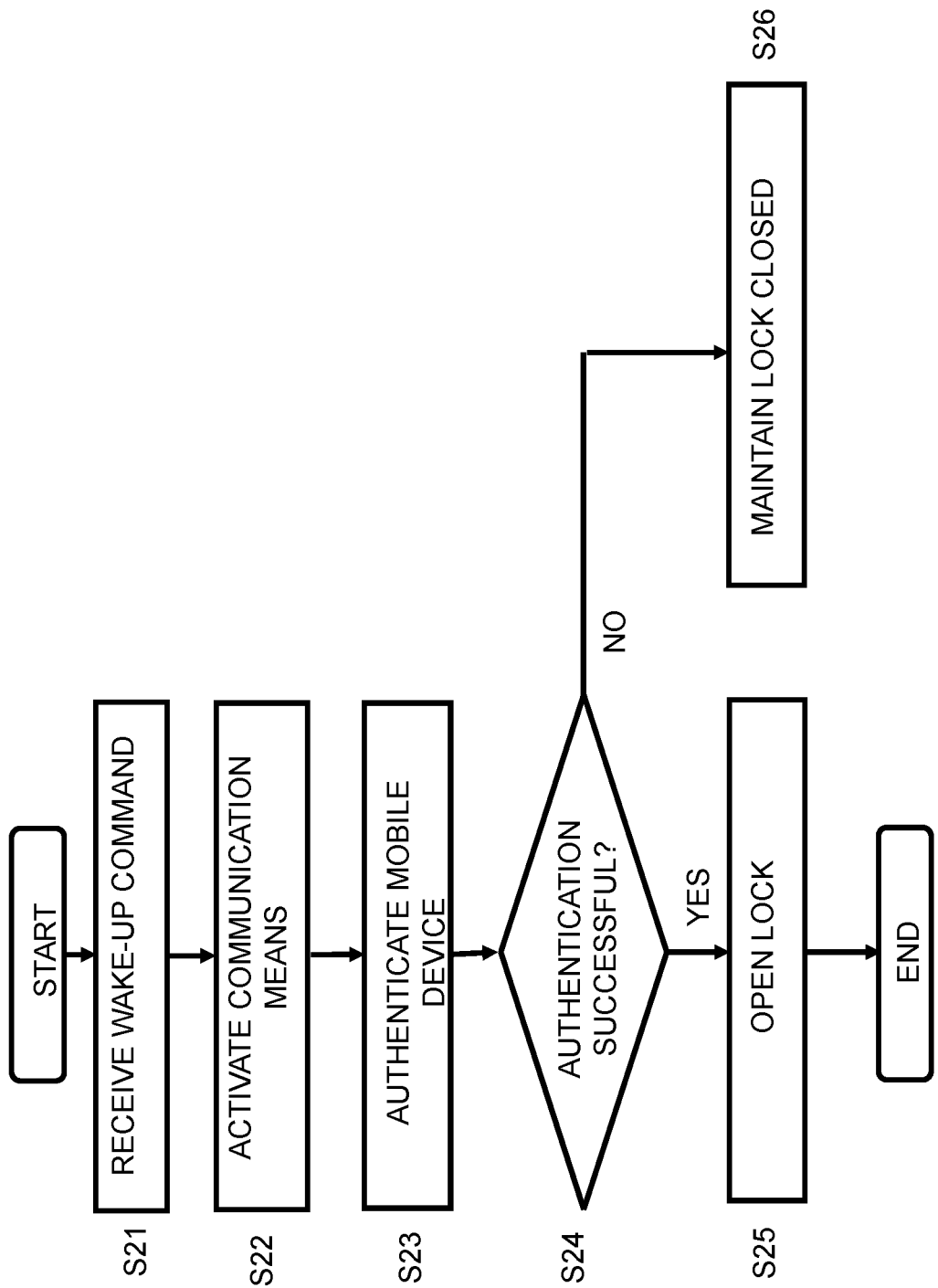
FIG. 3 shows a flowchart illustrating a procedure performed by a smart lock according to an embodiment of the present invention.

The controller 21 of the smart lock 2 shown in FIG. 1 may be configured to carry out a method as illustrated in FIG. 3.

That is, in step S21, the controller 21 receives a wake-up command from a control system, e.g., the control system 1. In step S22, the controller 21 sets the communication means into a state capable of sending and/or receiving a radio signal in response to receiving the wake-up command. In other word, in response to receiving the wake-up command, the controller 21 activates the communication means 23. Then, the controller 21 performs communication with a mobile device of a user via the communication means 23 and authenticates the mobile device in steps S23 and S24. When an access to the lock has been allowed to the authenticated mobile device, i.e., when the authentication is successful (Yes in step S24), the controller instructs the lock opening/closing means 24 to open the lock in step S25. When the authentication is not successful (No in step S24), the controller 21 may instruct the lock opening/closing means 24 to maintain the lock closed.

Thus, according to the embodiments described above, the radio function of a smart lock is only activated when a user is approaching the smart lock. An approaching user is detected by a control system which, for example, controls access to a building or controls an elevator. When the user is detected, the wake-up command is sent to the corresponding smart lock, so that, when the user arrives at the door, the radio connection (e.g., Bluetooth) to the mobile device of the user can be established. In this way, the smart lock can be opened without requiring that the user operates the mobile device.

In the following, some more detailed embodiments of the present invention are described. According to these embodiments, a Bluetooth connection as an example for the radio connection between the smart lock 2 and the mobile device 3 of the user is applied.

In particular, a user is identified by a system which is constantly powered on, like main door access control or in elevator access control. When the elevator or the main door access control system knows which person is using the elevator and when the person's home floor is known, the control system can send to a smart lock gateway module a command which is transferred to the smart lock. The smart lock will then put Bluetooth on for a limited time.

The control system may detect the user by performing an identification check of the user, an authentication with the user and/or by performing a recognition of the user. For example, in case of a main door access control, the user may be required to produce an identity card in order to get access to a building. In this way, it is possible to identify and authenticate the user. Alternatively, the user may be identified by a face recognition or the like.

According to a further embodiment, the elevator may send a command to the smart lock gateway module when the elevator arrives at a resident floor with load (i.e., passengers). That is, in this case all smart locks on this floor may be instructed to turn on the Bluetooth radio connection, or, when the particular user is known, only the smart lock of the door of the user may be instructed to put on the Bluetooth connection.

Alternatively, for example in case of an office building, when a user is identified at the entrance of the office building, the wake-up command may be sent to all smart locks the user is admitted to use.

As mentioned above, when the smart lock has activated its Bluetooth connection, it is possible to authenticate the user, i.e., the mobile device of the user without requiring that the user operates the mobile device. For example, the smart lock may sent an identification request to the mobile device, and the mobile device responds with an identification, which can be a certain code which is configured beforehand. This response to the identification request can be performed by an application on the phone dedicated to the smart home uses, for example, wherein, however, the application responds automatically without involving the user of the mobile device. When the identification is known to the smart lock, the smart lock opens. That is, the controller 21 shown in FIG. 1 instructs the lock opening/closing means 24 to open. Otherwise, the smart lock maintains the lock closed, and may also deactivate the Bluetooth radio connection.

However, the procedure how the smart lock authenticates the mobile device of the user is not limited to the procedure described above, and arbitrary other procedures may be applied.

Figure 4:
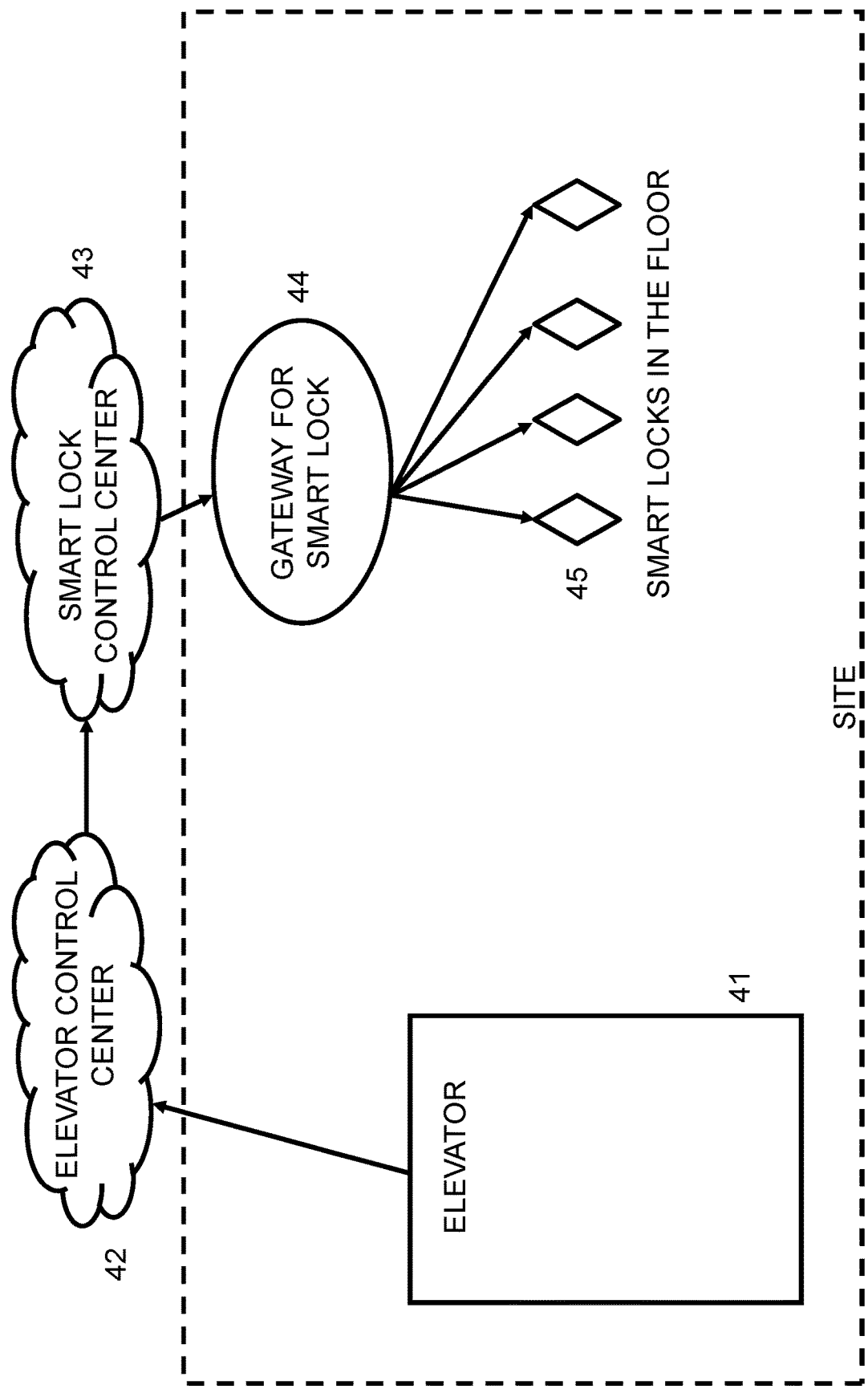
FIG. 4 shows a diagram illustrating a scenario comprising an elevator and smart locks on a site according to an embodiment of the present invention.

FIG. 4 shows an example for a scenario of a site comprising an elevator 41, which may comprise the elevator control device 1 shown in FIG. 1, and smart locks 45, which are arranged in the building, in this example on a floor in the building. The smart locks 45 may each have the configuration of the smart lock 2 shown in FIG. 1. The smart locks 45 are controlled by a gateway for smart lock 44 (as an example for a smart lock control device), which forwards control signals to the smart locks 45. In this scenario, it is assumed that a connection between the elevator 41 and the gateway for smart lock 44 is not carried directly, but via external control centers. For example, the elevator control and the smart lock control is provided by two different vendors. In this case, the elevator 41 (i.e., the elevator control device 1) sends the wake-up command to an elevator control center 42, for example via an Internet connection. The elevator control center 42 forwards the wake-up command to a smart lock control center 43, which then forwards the wake-up command to the gateway for smart lock 44.

A connection between the elevator control device and the gateway for smart lock 4 may be provided via a wired or a wireless network, for example by using an Internet protocol. For example, for this connection a Wifi or mobile data network such as 3G connection or the like may be applied.

According to the present embodiment, the connection between the gateway for smart lock and the smart locks in the floor is provided via a radio connection according to the Zigbee specification. In general, Zigbee is an IEEE 802.15.4-based specification for a suite of high-level communication protocols used to create personal area networks with small, low-power digital radios.

Hence, according to the embodiments as described above, it is not necessary that the Bluetooth connections (or other kind of radio connections) of the smart locks are always active. This is advantageous not only for battery-powered smart locks, but also for other kinds of smart locks, since power consumption can be reduced. Moreover, according to the embodiments, the user is not required to operate his/her mobile device in order to open a smart lock.

Embodiments of the present invention are not limited to the details of the embodiments as described above, and various modifications are possible.

For example, in the above embodiment it was described that the gateway for smart lock is connected to the smart locks via a radio connection according to the zigbee specification. However, the invention is not limited to this configuration. For example, other radio connection specifications could be applied, for example Wifi or a proprietary radio connection standard. Moreover, the connection between the gateway for smart lock and the smart lock does not have to be a radio connection, and also a wired connection is possible.

Furthermore, according to the embodiments described above, the wake-up command is sent to the smart lock via a gateway for smart lock. However, the invention is not limited to this, and the wake-up command may be sent directly to the smart locks, when a corresponding direct connection to the site control system is available.

Moreover, in the above embodiments it was described that the control system is a system which always powered on. However, the invention is not limited to this. For example, the site system may only be powered on during certain periods in a day or a week. In more detail, for example in office buildings, shops etc., the control system may only be powered on during usual or regular business hours or the like.

Moreover, in some embodiments it was described that the mobile device of the user is a smartphone. However, the invention is not limited to this. That is, any kind of mobile device which is capable of providing an identification via a radio connection can be applied. For example, a tablet computer, a music player etc. having a radio connection can be applied. Moreover, also an RFID chip may be applied.

In the flow chart shown in FIG. 3, step S26 instructing the lock opening/closing means 24 to maintain the lock closed is shown. However, when the default state of the lock is to be closed, then this step may be omitted, so that in case of an unsuccessful authentication (No in step S24), no action is required and the procedure ends.

It is to be understood that any of the above modifications can be applied singly or in combination to the respective aspects and/or embodiments to which they refer, unless they are explicitly stated as excluding alternatives.

Furthermore, control systems, e.g., elevator control systems and/or main door access control systems, as well as corresponding functions as described herein, and other elements, functions or applications may be implemented by software, e.g. by a computer program product for a computer, and/or by hardware. For executing their respective functions, correspondingly used devices, elements or functions may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means etc.) and the like. It is to be noted that in the present specification processing portions should not be only considered to represent physical portions of one or more processors, but may also be considered as a logical division of the referred processing tasks performed by one or more processors.

For the purpose of the present invention as described herein above, it should be noted that
- embodiments suitable to be implemented as software code or portions of it and being run using a processor or processing function are software code independent and can be specified using any known or future developed programming language, such as a high-level programming language, such as objective-C, C, C++, C#, Java, Python, Javascript, other scripting languages etc., or a low-level programming language, such as a machine language, or an assembler.
- implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).
- embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described,
- a device may be implemented by a semiconductor chip, a chipset, or a (hardware) module including such chip or chipset;
- embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.
- embodiments may also be implemented as computer program products, including a computer usable medium having a computer readable program code embodied therein, the computer readable program code adapted to execute a process as described in embodiments, wherein the computer usable medium may be a non-transitory medium.

Although the present invention has been described herein before with reference to particular embodiments thereof, the present invention is not limited thereto and various modifications can be made thereto.

The invention claimed is:

1. A smart lock comprising:
a controller,
a communication network connection and
a lock opening/closing mechanism, wherein the controller is configured to
receive a wake-up command from an elevator control system when a user is detected by the control system as the user is approaching the smart lock,
set the communication network connection into a state capable of sending and/or receiving a radio signal in response to receiving the wake-up command,
perform communication with a mobile device of the user via the communication network connection,
authenticate the mobile device of the user,
instruct the lock opening/closing mechanism to open the smart lock when an access to the smart lock has been allowed to the authenticated mobile device, wherein
the controller is configured to shift the communication network connection into a state in which it is not capable of sending and/or receiving the radio signal after the smart lock has been opened or after a predetermined time since receiving the wake-up command has elapsed.

2. The smart lock according to claim 1, wherein the radio signal is a Bluetooth signal.

3. The smart lock according to claim 1, wherein the radio signal is a Bluetooth signal.

4. An elevator control system comprising a controller and an interface,
wherein the controller is configured to:
detect at least one user permitted to use at least one smart lock as the user is approaching the at least one smart lock, and
send a wake-up command via the interface to the at least one smart lock by which the at least one smart lock is instructed to activate a radio connection for a mobile device of the at least one user,
wherein the at least one smart lock belongs to a group of smart locks, and the controller is configured to send the wake-up command to all smart locks of the group of smart locks when detecting the at least one user permitted to use at least one smart lock of the group of smart locks; and
wherein the control system controls an elevator, and the group of smart locks is provided on doors on a predetermined floor, and the controller is configured to detect the at least one user permitted to use at least one smart lock of the group of smart locks when a call is made to the predetermined floor or an elevator car is arriving at the predetermined floor.

5. The control system according to claim 4, wherein the controller is configured to detect the at least one user by performing an authentication with at least one the user and/or by performing a recognition of the at least one user.

6. The control system according to claim 4, wherein the control system is configured to control site and/or building related control functions.

7. The control system according to claim 4, wherein the control system is configured to control main door access and/or an elevator access.

8. The control system according to claim 4, wherein the controller is configured to
send the wake-up command to the at least one lock via a smart lock control device configured to control the at least one smart lock.

9. The elevator control system according to claim 4, wherein the elevator control system comprises a smart lock and
a controller,
a communication network connection and
a lock opening/closing mechanism, wherein the controller is configured to
receive a wake-up command from a control system,
set the communication network connection into a state capable of sending and/or receiving a radio signal in response to receiving the wake-up command,
perform communication with a mobile device of a user via the communication network connection,
authenticate the mobile device,
instruct the lock opening/closing mechanism to open the smart lock when an access to the smart lock has been allowed to the authenticated mobile device, and
shift the communication network connection into a state in which it is not capable of sending and/or receiving the radio signal after the smart lock has been opened or after a predetermined time since receiving the wake-up command has elapsed.

10. The control system according to claim 5, wherein the control system is configured to control site and/or building related control functions.

11. The control system according to claim 4, wherein the control system is configured to control site and/or building related control functions.

12. The control system according to claim 5, wherein the control system is configured to control main door access and/or an elevator access.

13. A method for controlling a smart lock, comprising:
detecting, by an elevator control system, at least one user permitted to use at least one smart lock as the at least one user is approaching the at least one smart lock;
sending, by the elevator control system, a wake-up command to the at least one smart lock by which the at least one smart lock is instructed to activate a radio connection for a mobile device of the at least one user;
receiving, from the elevator control system, the wake-up command,
setting communication network connection into a state capable of sending and/or receiving a radio signal in response to receiving the wake-up command,
performing communication with the mobile device of the at least one user via the communication network connection,
authenticating the mobile device,
instructing a lock opening/closing mechanism to open the at least one smart lock when the mobile device is authenticated, and
shifting the communication network connection into a state in which it is not capable of sending and/or receiving the radio signal after the at least one smart lock has been opened or after a predetermined time since receiving the wake-up command has elapsed.

* * * * *